2,995,423
Patented Aug. 8, 1961

2,995,423
CRYSTALLINE ZEOLITE M
Donald W. Breck, Tonawanda, and Nancy A. Acara, Kenmore, N.Y., assignors to Union Carbide Corporation, a corporation of New York
No Drawing. Filed Sept. 20, 1957, Ser. No. 685,089
4 Claims. (Cl. 23—113)

This invention relates to a novel composition of matter, and to a process for preparing and utilizing this novel material. More particularly, the invention is concerned with a novel, synthetic member of the zeolite family.

The term "zeolite," in general, refers to a group of naturally occurring, hydrated, metal aluminosilicates, many of which are crystalline in structure. The synthetic material of the invention has a composition similar to certain of the natural crystalline zeolites. Accordingly, the term "synthetic zeolite" is applied to the materials prepared by the process of the invention. There are, however, significant differences between the synthetic and natural materials. For convenience and distinguishability, the synthetic material of the invention will be referred to hereinafter as "zeolite M."

Crystalline zeolites structurally consist basically of an open, three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, e.g., alkali metal or alkaline earth metal ions. This balance may be expressed by the formula $2Al/(2Na, 2K, 2Li, Ca, Ba, Mg, Zn, Sr, etc.)=1$. Moreover, it has been found that one cation may be replaced for another by suitable exchange techniques. Consequently, crystalline zeolites are often employed as ion-exchange agents.

It is also known that the crystal structures of many zeolites exhibit interstices of molecular dimensions. The interstitial spaces are generally occupied by water of hydration. Under proper conditions, viz., after at least partial dehydration, these zeolites may be utilized as efficient adsorbents whereby adsorbate molecules are retained within the interstitial spaces. Access to these channels is had by way of orifices in the crystal lattice. These openings limit the size and shape of the molecules that can be adsorbed. A separation of mixtures of foreign molecules based upon molecular dimensions, wherein certain molecules are adsorbed by the zeolite while others are refused, is therefore possible. It is this characteristic property of many crystalline zeolites that has led to their designation as "molecular sieves." In addition to molecular size and shape, however, other factors may also influence the selective adsorption of certain foreign molecules by molecular sieves. Among these factors are: the polarizability and polarity of the adsorbate molecules; the degree of unsaturation of organic adsorbates; the size and polarizing power of the interstitial cation; the presence of adsorbate molecules in the interstitial spaces; and the degree of hydration of the zeolite.

A number of synthetic crystalline zeolites have been prepared. They are distinguishable from each other, and from the naturally occurring material, on the basis of their composition, crystal structure, and adsorption properties. A suitable method for distinguishing these compounds, for example, is by their X-ray powder diffraction patterns. The existence of a number of zeolites having similar but distinguishable properties advantageously permits the selection of a particular member having optimum properties for a particular use.

The present invention has as its prime object the provision of a novel, synthetic, crystalline zeolite of the molecular sieve type. Another object is to provide a novel, synthetic, crystalline zeolite having useful ion-exchange and adsorption properties. A further object is to provide a convenient and efficient process for preparing the novel material of the invention.

The composition of crystalline zeolite M may stoichiometrically be expressed in terms of mole ratios of oxides, as follows:

$$1.0\pm 0.1 K_2O : Al_2O_3 : 2.1 \pm 0.1 SiO_2 : xH_2O$$

wherein "$x$" may be any value from 0 to about 2. Minor variations in the mole ratios of these oxides, within the ranges indicated by the above formula, do not significantly change the crystal structure or physical properties of the zeolite.

In addition to composition, zeolite M may be identified, and distinguished from other zeolites, and other crystalline substances, by the X-ray powder diffraction pattern, the data for which are set forth below in Table A. In obtaining the X-ray powder diffraction pattern, standard techniques were employed. The radiation was the K-alpha doublet of copper, and Geiger counter spectrometer with a strip chart pen recorder was used. The peak heights, I, and the positions as a function of $2\theta$, where $\theta$ is the Bragg angle, were read from the spectrometer chart. From these, the relative intensities, $100I/I_0$, where $I_0$ is the intensity of the strongest line or peak, and $d(A.)$ observed, the interplanar spacing in Angstrom units, corresponding to the recorded lines were determined. In separate columns, the theoretical interplanar spacings, $d(A.)$ theoretical, and the Miller indices $(hkl)$ corresponding to the recorded lines are also listed.

Table A

| Bragg Angle $2\theta$ | Relative Intensity, $100I/I_0$ | Interplanar Spacing, $d(A.)$ | | Miller Indices $(hkl)$ |
|---|---|---|---|---|
| | | Observed | Theoretical | |
| 12.6 | 18 | 7.02 | 6.95 | 111 |
| 13.5 | 6 | 6.55 | 6.56 | 200 |
| 19.7 | 8 | 4.50 | 4.56 | 112 |
| 20.9 | 21 | 4.25 | 4.24 | 221 |
| 22.3 | 3 | 3.98 | 4.04 | 301 |
| 25.4 | 6 | 3.50 | 3.50 | 003 |
| 28.8 | 100 | 3.10 | 3.09 | 203 |
| 30.0 | 16 | 2.98 | 3.00 | 213 |
| 31.6 | 15 | 2.83 | 2.82 | 421 |
| 34.4 | 27 | 2.60 | 2.624 | 500 |
| 39.9 | 5 | 2.26 | 2.251 | 530 |
| 40.5 | 5 | 2.23 | 2.166 | 314 |
| 42.5 | 14 | 2.12 | 2.113 | 611 |

The X-ray powder diffraction pattern for zeolite M indicates tetragonal unit cells having repeat distances of approximately 13.12 Angstrom units in two cell dimensions, and a repeat distance of approximately 10.48 Angstrom units in the third cell dimension.

The particular X-ray technique and/or apparatus employed, the humidity, the temperature, the orientation of the powder crystals, and other variables, all of which are well known and understood to those skilled in the art of X-ray crystallography or diffraction, may cause some variation in the intensities and positions of the X-ray lines. Thus, the X-ray data given herein to identify zeolite M are not to exclude those materials which, due to some variable mentioned above otherwise known to those skilled in the art, fail to show all of the tabulated X-ray lines, or show a few extra ones permissibly to the crystal system of the zeolite, or show a slight change in intensity or shift in position of some of the X-ray lines as set forth in Table A.

In an embodiment of the present invention, zeolite M is prepared by suitably heating an aqueous potassium aluminosilicate mixture whose composition, expressed in terms of mole ratios of oxides, falls within the following ranges:

$K_2O/SiO_2$ from about 7 to 10
$SiO_2/Al_2O_3$ from about 7 to 10
$H_2O/K_2O$ from about 5 to 7

The desired product is thereby crystallized out. In making zeolite M, representative reactants are silica gel, silicic acid, or potassium silicate as a source of silica. Alumina may be obtained from activated alumina, alpha alumina, gamma alumina, alumina trihydrate, aluminum hydroxide, or potassium aluminate. Potassium hydroxide may supply the potassium ions, and, in addition, assist in controlling the pH of the reactant mixture. Preferably, the reactants are water soluble. A solution of the reactants, in proper proportions, is placed in a container, made, for example, of metal or glass. The container should be closed to prevent loss of water. A convenient and preferred procedure for preparing the reactant mixture is to make an aqueous solution containing the potassium aluminate and hydroxide, and add this, with agitation, to an aqueous solution of potassium silicate. The resultant mixture is then stirred to insure homogeneity.

The crystallization procedure may be satisfactorily carried out at temperatures of from about 100° C. to 120° C., the pressure being atmospheric, or at least that corresponding to the vapor pressure of water in equilibruim with the mixture of reactants at the higher temperature. Preferably a temperature of approximately 100° C. is employed. Any suitable heating apparatus, e.g., an oven, sand bath, oil bath, or jacketed autoclave, may be used. Heating is continued until the desired crystalline zeolite product is formed. The zeolite crystals are then filtered off and washed to separate them from the reactant mother liquor. The zeolite crystals should be washed, preferably with distilled water, until the effluent wash water, in equilibrium with the product, has a pH of between about 9 and 12. As the zeolite crystals are washed, some of the potassium ions in the zeolite may be removed, and are believed to be replaced by hydrogen ion. If the washing is discontinued when the pH of the effluent wash water is about 10, the $K_2O/Al_2O_3$ molar ratio of the product will be between about 0.9 and 1.0. Excessive washing will result in a somewhat lower value for this ratio, while insufficient washing may leave slight excesses of potassium associated with the product. Thereafter, the zeolite crystals may be dried, conveniently in a vented oven.

Typical of the manner in which zeolite M, may be prepared is the following example. A solution of potassium aluminate was prepared by initially mixing 33.7 grams of potassium hydroxide, 1 gram of aluminum hydroxide containing .0064 mole of $Al_2O_3$, and 22.78 ml. of water, and heating the mixture until the reactants dissolved. The solution was then cooled to room temperature, and added to 9.95 grams of a potassium silicate solution containing 12.6 percent of $K_2O$ and 27.1 percent of $SiO_2$ by weight. The resulting mixture was stirred until homogeneous. Crystallization of the desired zeolite product was carried out by heating the reactant mixture in a sealed glass jar at a temperature of 100° C. for approximately 66 hours. The crystalline product which formed had thereupon settled to the bottom of the jar, and the reactant mother liquid was clear. The crystalline product was then filtered, washed with water until the effluent wash water had a pH of about 10.5 to 11.0, and dried at a temperature of 110° C. in an air-circulating oven. Analysis of the product showed it to be a zeolite having a composition, expressed in terms of mole ratios of oxides, $1.08K_2O:Al_2O_3:2.13SiO_2:1.7H_2O$ X-ray analysis of the product indicated a diffraction pattern characteristic of zeolite M, as set forth above in Table A.

For satisfactory use as an adsorbent, zeolite M should be activated by at least partial dehydration. Such activation may be performed, for example, by heating the zeolite to temperatures of approximately 300° C. under atmospheric or reduced pressure, or by maintaining the zeolite at room temperature under vacuum. Unlike common adsorbents, such as charcoal and silica gel, which show adsorption selectivities based primarily on the boiling point or critical temperature of the adsorbate, activated zeolite M exhibits a selectivity based on the size, degree of unsaturation, and shape of the adsorbate molecule. Adsorption by zeolite M is generally limited to small, polar molecules, such as water. Another property of zeolite M which contributes to its usefulness is that of adsorbing relatively large quantities of adsorbate at either very low pressures or concentrations. The novel material of this invention may therefore be utilized as a selective adsorbent in numerous gas or liquid separation processes, whereby small, polar molecules, particularly water, are separated from mixtures with other materials. The zeolite may also find use in cyclic adsorption-desorption processes for water, and possibly other adsorbates.

Samples of zeolite M prepared in accordance with the process of the invention as hereinabove described, and which had been activated by dehydration at a temperature of approximately 300° C., under vacuum, were tested to determine their adsorption properties. The adsorption properties were measured in a McBain adsorption system. The zeolite samples were placed in light aluminum buckets suspended from quartz springs. They were activated in situ, and the gas or vapor under test was then admitted. The gain in weight of the adsorbent was measured by the spring extensions as read by a cathetometer. At a temperature of 25° C., and an adsorbate pressure of 24 mm. Hg, the zeolite was found to adsorb water to an extent of 10.3 percent, by weight. At a similar temperature, and an adsorbate pressure of 100 mm. Hg, the zeolite showed a degree of methanol adsorption corresponding to a 2.5 percent increase in the weight of the adsorbent.

Zeolite M can be used as an adsorbent for the purposes indicated above in any suitable form. By way of illustration, a column of powdered crystalline material may give excellent results, as may a pelleted form obtained by pressing into pellets a mixture of zeolite M and a suitable bonding agent such as clay.

Zeolite M may be ion-exchanged with other cations to form derivatives thereof by conventional ion-exchange techniques. A preferred, continuous method for ion-exchange is to pack the zeolite into a series of vertical columns with suitable supports at the bottom; successively pass through the beds, at room temperature, a water solution of a soluble salt of the cation to be introduced into the zeolite; and change the flow from the first bed to the second as the zeolite in the first bed becomes ion-exchanged to the extent desired. Illustration of convenient exchanging solutions are: for hydrogen exchange, a dilute water solution of an acid such as hydrochloric acid; for sodium exchange, a water solution of sodium chloride or dilute sodium hydroxide; for silver exchange, a water solution of silver nitrate; for ammonium, calcium exchange, and the like, water solution of the chlorides of these cations.

What is claimed is:

1. A synthetic, crystalline zeolite having a composition, expressed in terms of mole ratios of oxides, as follows:

$1.0 \pm 0.1 K_2O : Al_2O_3 : 2.1 \pm 0.1 SiO_2 : xH_2O$ wherein "x" represents any value from 0 to about 2, said crystalline zeolite having an X-ray powder diffraction pattern essentially as shown in Table A

Table A

| Relative intensity, $100I/I_0$: | Interplanar spacing, $d(\text{A.})$ observed |
|---|---|
| 18 | 7.02 |
| 6 | 6.55 |
| 8 | 4.50 |
| 21 | 4.25 |
| 3 | 3.98 |
| 6 | 3.50 |
| 100 | 3.10 |
| 16 | 2.98 |
| 15 | 2.83 |
| 27 | 2.60 |
| 5 | 2.26 |
| 5 | 2.23 |
| 14 | 2.12 |

2. The ion-exchanged forms of a synthetic, crystalline zeolite having a composition, expressed in terms of mole ratios of oxides, as follows:

$$1.0 \pm 0.1 K_2O : Al_2O_3 : 2.1 \pm 0.1 SiO_2 : xH_2O$$

wherein "$x$" represents any value from 0 to about 2, said crystalline zeolite having an X-ray powder diffraction pattern essentially as shown in Table A

Table A

| Relative intensity, $100I/I_0$: | Interplanar spacing, $d(\text{A.})$ observed |
|---|---|
| 18 | 7.02 |
| 6 | 6.55 |
| 8 | 4.50 |
| 21 | 4.25 |
| 3 | 3.98 |
| 6 | 3.50 |
| 100 | 3.10 |
| 16 | 2.98 |
| 15 | 2.83 |
| 27 | 2.60 |
| 5 | 2.26 |
| 5 | 2.23 |
| 14 | 2.12 | and the cation exchanged is taken from the class consisting of group I and group II of the periodic table and hydrogen and ammonium ions.

3. A process for preparing a crystalline zeolite having a composition expressed in terms of mole ratios of oxides, as follows:

$$1.0 \pm 0.1 K_2O : Al_2O_3 : 2.1 \pm 0.1 SiO_2 : xH_2O$$

wherein "$x$" represents any value from 0 to about 2, said crystalline zeolite having an X-ray powder diffraction pattern essentially as shown in Table A

Table A

| Relative intensity, $100I/I_0$: | Interplanar spacing, $d(\text{A.})$ observed |
|---|---|
| 18 | 7.02 |
| 6 | 6.55 |
| 8 | 4.50 |
| 21 | 4.25 |
| 3 | 3.98 |
| 6 | 3.50 |
| 100 | 3.10 |
| 16 | 2.98 |
| 15 | 2.83 |
| 27 | 2.60 |
| 5 | 2.26 |
| 5 | 2.23 |
| 14 | 2.12 | which process comprises preparing an aqueous potassium aluminosilicate mixture whose composition, expressed in terms of mole ratios of oxides, falls within the following ranges:

$K_2O/SiO_2$ from about 7 to 10
$SiO_2/Al_2O_3$ from about 7 to 10
$H_2O/K_2O$ from about 5 to 7 and maintaining such mixture at a temperature of between about 100° C. and 120° C. until the desired crystalline zeolite product is formed.

4. A process for preparing a crystalline zeolite having a composition expressed in terms of mole ratios of oxides, as follows:

$$1.0 \pm 0.1 K_2O : Al_2O_3 : 2.1 \pm 0.1 SiO_2 : xH_2O$$

wherein "$x$" represents any value from 0 to about 2, said crystalline zeolite having an X-ray powder diffraction pattern essentially as shown in Table A

Table A

| Relative intensity, $100I/I_0$: | Interplanar spacing, $d(\text{A.})$ observed |
|---|---|
| 18 | 7.02 |
| 6 | 6.55 |
| 8 | 4.50 |
| 21 | 4.25 |
| 3 | 3.98 |
| 6 | 3.50 |
| 100 | 3.10 |
| 16 | 2.98 |
| 15 | 2.83 |
| 27 | 2.60 |
| 5 | 2.26 |
| 5 | 2.23 |
| 14 | 2.12 | which process comprises preparing an aqueous potassium aluminosilicate mixture whose composition, expressed in terms of mole ratios of oxides, falls within the following ranges:

$K_2O/SiO_2$ from about 7 to 10
$SiO_2/Al_2O_3$ from about 7 to 10
$H_2O/K_2O$ from about 5 to 7 maintaining such mixture at a temperature of approximately 100° C. until the desired crystalline zeolite product is formed, and separating the result crystals from the reactant mother liquor.

References Cited in the file of this patent

UNITED STATES PATENTS

| Number | Name | Date |
|---|---|---|
| 1,949,360 | Schorger | Feb. 27, 1934 |
| 1,965,923 | Griesbach et al. | July 10, 1934 |
| 2,467,215 | McCarter | Apr. 12, 1949 |
| 2,560,931 | Chapman et al. | July 17, 1951 |
| 2,810,455 | Veltman | Oct. 22, 1957 |
| 2,790,512 | Dow | Apr. 30, 1957 |
| 2,882,243 | Milton | Apr. 14, 1959 |
| 2,882,244 | Milton | Apr. 14, 1959 |